US010982522B1

(12) United States Patent
Hill et al.

(10) Patent No.: US 10,982,522 B1
(45) Date of Patent: Apr. 20, 2021

(54) MISSILE FOR FRAC MANIFOLD

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Jersey Village, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 0 days.

(21) Appl. No.: 16/514,672

(22) Filed: Jul. 17, 2019

Related U.S. Application Data

(60) Provisional application No. 62/699,981, filed on Jul. 18, 2018.

(51) Int. Cl.
*E21B 43/26* (2006.01)
*F16L 41/12* (2006.01)

(52) U.S. Cl.
CPC .............. *E21B 43/26* (2013.01); *F16L 41/12* (2013.01)

(58) Field of Classification Search
CPC .................................. E21B 43/26; F16L 41/12
See application file for complete search history.

(56) References Cited

U.S. PATENT DOCUMENTS 3,999,785 A * 12/1976 Blakeley ................. F16L 41/12
285/111
4,391,458 A * 7/1983 Blakeley ................. F16L 41/12
285/112
6,302,141 B1 10/2001 Markulec et al.
6,575,247 B2 6/2003 Tolman et al.
6,874,538 B2 4/2005 Bennett
7,070,209 B2 * 7/2006 Collins ................... F16L 41/06
285/133.21
7,686,041 B2 3/2010 Eidsmore et al.
8,376,046 B2 * 2/2013 Broussard, II .......... E21B 43/26
166/308.1
8,469,108 B2 6/2013 Kajaria et al.
(Continued)

OTHER PUBLICATIONS

Cameron, *Frac Manifold Systems—Increase Operational Efficiencies of Simultaneous Completion Operations* (© 2016 Schlumberger).
(Continued)

*Primary Examiner* — Aaron L Lembo
(74) *Attorney, Agent, or Firm* — Keith B. Willhelm

(57) ABSTRACT

Missiles for frac manifolds manifold the discharge from a plurality of pumps. The missile comprises a missile body and inlet assemblies. The missile body has a straight primary bore and a plurality of feed bores. The primary bore extends axially through the missile body. The feed bores extend radially through the missile body and define a socket. An inlet assembly is associated with each feed bore. The inlet assembly comprises a nipple and a collar. The nipple has a bore extending axially between a spigot and a union end. The nipple is connected to the collar. The spigot is received in the socket of the feed bore. The union end is adapted for connection to a flowline component. The collar comprises mating parts releasably coupled together around the missile body. The nipple is thereby releasably coupled to the missile body by coupling the collar to the missile body.

23 Claims, 8 Drawing Sheets

(56) References Cited

U.S. PATENT DOCUMENTS

| | | | |
|---|---|---|---|
| 8,656,990 B2 | 2/2014 | Kajaria et al. | |
| 8,813,836 B2 | 8/2014 | Kajaria et al. | |
| 8,839,867 B2 * | 9/2014 | Conrad | E21B 17/02 |
| | | | 166/308.1 |
| 8,950,433 B2 | 2/2015 | Manofsky et al. | |
| 8,978,763 B2 * | 3/2015 | Guidry | E21B 43/26 |
| | | | 166/308.1 |
| 9,127,545 B2 * | 9/2015 | Kajaria | F16L 23/08 |
| 9,227,252 B2 | 1/2016 | Horiguchi | |
| 9,903,190 B2 * | 2/2018 | Conrad | E21B 43/26 |
| 9,995,102 B2 * | 6/2018 | Dille | B60P 3/2205 |
| 10,260,327 B2 * | 4/2019 | Kajaria | E21B 43/26 |
| 10,309,568 B2 * | 6/2019 | Borawski | F16L 41/12 |
| 10,323,475 B2 * | 6/2019 | Christopherson | E21B 44/00 |
| 10,385,644 B2 * | 8/2019 | Guidry | E21B 34/02 |
| 10,662,749 B1 * | 5/2020 | Hill | F16L 41/00 |
| 10,683,708 B2 * | 6/2020 | Hill | F04B 49/08 |
| 10,738,569 B2 * | 8/2020 | Tran | E21B 33/02 |
| 10,738,928 B2 * | 8/2020 | Arizpe | F16F 7/14 |
| 2007/0114039 A1 | 5/2007 | Hobdy et al. | |
| 2010/0300672 A1 | 12/2010 | Childress et al. | |
| 2011/0048695 A1 | 3/2011 | Cherewyk et al. | |
| 2012/0181016 A1 | 7/2012 | Kajaria et al. | |
| 2012/0181030 A1 | 7/2012 | Kajaria et al. | |
| 2013/0014947 A1 | 1/2013 | Wilkins et al. | |
| 2015/0000766 A1 | 1/2015 | Arizpe et al. | |
| 2015/0184491 A1 | 7/2015 | Kajaria et al. | |
| 2015/0292297 A1 | 10/2015 | Kajaria et al. | |
| 2016/0060997 A1 | 3/2016 | Thomas | |
| 2016/0115773 A1 | 4/2016 | Conrad et al. | |
| 2017/0123437 A1 | 5/2017 | Boyd et al. | |
| 2018/0187507 A1 | 7/2018 | Hill et al. | |
| 2018/0187537 A1 | 7/2018 | Hill et al. | |
| 2018/0187662 A1 | 7/2018 | Hill et al. | |
| 2018/0223640 A1 * | 8/2018 | Keihany | F16L 41/03 |
| 2018/0283151 A1 * | 10/2018 | Cook | F16L 27/0804 |

OTHER PUBLICATIONS

Cameron, *Monoline Flanged-Connection Fracturing Fluid Delivery Technology* (© 2016 Schlumberger).

Forum Energy Technologies, *Smart Solutions. Powerful Products.* (undated—print date Jan. 2018) (with undated photos).

\* cited by examiner

MISSILE FOR FRAC MANIFOLD

FIELD OF THE INVENTION

The present invention relates generally to fluid transportation systems and flow lines used in those systems, and especially to frac manifolds, flow lines, and flowline components used to convey abrasive, corrosive fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17 which control flow into and out of the well. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The larger units of a frac system are transported to a well site on skid, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Though not entirely apparent from the schematic representation of FIG. 1, it will be appreciated that conventional frac systems are assembled from a very large number of individual components. Assembly of so many units on site can be time consuming, expensive, and hazardous. Thus, some components of a frac system are assembled off site on skids or trailers and transported as a unit to the well site.

Commonly skidded units include not only process units, such as blender 6 and pumps 10, but also flow units. Frac manifold 9, for example, is an assembly of pipes, junctions, valves, and other flowline components that typically are assembled off-site. Collectively, they provide a flow unit that manifolds, distributes, and controls discharge from pumps 10. Zipper manifold 16 is another flow unit that at times is assembled off-site from separate flowline components. Zipper manifold 16 receives flow from flow lines 14 and selectively distributes it to multiple well heads 17. Such units may have been assembled on site in the past. By skidding them, or mounting them on a trailer, assembly time at the well site is greatly reduced. Moreover, the components typically may be assembled more efficiently and reliably, and may be tested more easily in an off-site facility.

At the same time, because they are transported as a unit, trailered and skidded units are subject to spatial constraints that typically are not so severe as on site. Frac trailers, for example, have multiple flow lines incorporating a large number of flowline components, both on the high-pressure side and the low-pressure side. Multiple flow lines are manifolded. Providing all those flow lines and manifolds on a trailer which meets highway regulatory requirements often results in a complex, cluttered design which may be difficult or impossible to service on site.

The large number of individual components in a frac system is compounded by the fact that most conventional frac systems incorporate a number of relatively small flow lines, typically 3" and 4" flow lines. In part that is unavoidable. The pumps cannot be deployed in series and the flow lines carrying their individual discharges must be manifolded. Likewise, if multiple wells are to be serviced by the same array of pumps without assembling and disassembling flow lines, at some point their collective discharge must be split or directed into different flowline segments.

On the other hand, multiple flow lines in many instances represent a design choice. That is, certain flow rates and pressures will be required to fracture a particular well. Those flow rates and pressures will determine the number and capacities of the pumps. The high-pressure side then is designed to deliver the required flow rate without exceeding a maximum or "erosional" flow velocity, typically about 40 ft/sec, through the system. Additional flow lines often are added to provide higher flow rates into a well. The net result is that a fracking system often is so complicated that it resembles to the uninitiated a tangled mass of spaghetti.

Efforts have been made to simplify the flow line by incorporating fewer segments. For example, the conventional frac system illustrated in FIG. 1 includes four flow lines 14 running from the high-pressure lines 13 of frac manifold 9 to goat head 15. Some frac systems now employ a single, larger flowline segment running in place of four smaller lines. A single larger flow line will incorporate fewer parts and, therefore, fewer potential leak points. Both in terms of direct material and labor costs, a single larger flow line often will be less expensive than multiple smaller lines.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Moreover, at least in the early stages of production, the flow back after fracturing also will be at high pressure and flow rates. The initial production stream from a fractured well flows at pressures in the range of from 3,000 to 5,000 psi, and more and more commonly up to 10,000 psi. The flow rates can approach a million cubic feet per hour or more.

Given the high number of components, leaking at unions is always a concern in frac systems. The unions may not always be assembled properly. Even when assembled to specification, however, such issues are exacerbated by the extremely high pressures and flow rates through the system. Moreover, the abrasive and corrosive nature of the slurry flowing through a frac system can rapidly erode and weaken conduit walls. Flow through relatively long straight sections of pipe is relatively laminar. Flow through other areas, however, may be quite turbulent. Erosion also is a more significant issue where a flow line changes direction. Flow will more directly impact conduit walls, causing more abrasion than that caused simply by fluid passing over the walls. The flowlines in conventional frac manifolds, in particular, typically have numerous, relatively sharp turns which are susceptible to damage.

The high pressures and flow rates of fluid flowing through the system also typically will create vibration throughout the system. The vibration can be profound. It tends to create bending stress through the system which can exacerbate leakage, especially at unions. The effects of accumulated stress over periods of time also can accelerate corrosion and erosion of flowline components.

The statements in this section are intended to provide background information related to the invention disclosed and claimed herein. Such information may or may not constitute prior art. It will be appreciated from the foregoing, however, that there remains a need for new and improved frac manifolds and high-pressure flow lines and flowline components. Likewise, there is a need for new and improved methods of assembling flow lines and fluid transportation systems. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and encompasses various embodiments and aspects, some of which are specifically described and illustrated herein. One broad embodiment provides for missile flow lines which may be incorporated into frac manifolds, especially trailered or skidded frac manifolds. The missiles manifold the discharge from a plurality of pumps and comprise a missile body and inlet assemblies. The missile body has a straight primary bore and a plurality of feed bores. The primary bore extends axially through the missile body. The feed bores extend radially through the missile body and define a socket.

An inlet assembly is associated with each feed bore. The inlet assembly comprises a nipple and a collar. The nipple has a bore extending axially between a spigot and a union end. The nipple is connected to the collar. The spigot is received in the socket of the feed bore. The union end is adapted for connection to a flowline component. The collar comprises mating parts releasably coupled together around the missile body. The nipple is thereby releasably coupled to the missile body by coupling the collar to the missile body.

Other embodiments provide missiles comprising a locator locking the collar in a location along the missile body. The locator may be a washer received in an annular recess around the feed bore socket and an annular recess in the collar.

Still other embodiments provide missiles where the missile body is cylindrical or where the missile body is machined from a cylindrical bar. In other embodiments the missile body union ends adapted for connection to a flowline component, such as pin-in-box union subs, flange union subs, hammer union subs, or clamp union subs.

Additional embodiments provide missiles where the nipple union end has a pin-in-box union sub, a flange union sub, a hammer union sub, or a clamp union sub. In other embodiments the inlet assembly comprises two nipples. In still other embodiments the nipple is releasably coupled to the collar. The nipple may comprise a flange and the flange may be releasably coupled to the collar by threaded connectors.

Yet other embodiments provide missiles where the collar comprises first and second halves joined by threaded connectors, each half extending approximately halfway around the missile body. Other embodiments provide missiles where the collar has a substantially cylindrical engagement surface receiving the missile body and has a flat lower bearing surface.

Further embodiments provide missiles where the first and second collar halves each comprise a first sub and a second sub. Each sub has a first end and a second end. The first end of the subs is connected to the nipple. The second end of the subs is adapted for releasably coupling to a second end of a sub of the other collar half. Other embodiments provide missiles where the first ends of the subs are releasably coupled to the nipple. The first ends of the subs may engage the nipple by an interference fit and the second ends may be joined to the mating components by threaded connectors. In other embodiments the first ends of the subs are integral with the nipple and the second ends are releasably coupled to their mating component by threaded connectors. Yet other embodiments provide missiles where the first and second subs have a curved shape.

Additional embodiments provide missiles where the ratio of the minimum width of the missile body to the maximum width of the primary bore is at least about 3 to 2. In other embodiments the missile has a generally cylindrical missile body and the ratio of the diameter of the missile body to the diameter of the primary bore is at least about 3 to 2. Yet other embodiments provide missiles where the ratio is at least about 2 to 1 or at least about 3 to 1.

Other embodiments provide missiles where the primary bore has an inner diameter about equal to or greater than 5 inches or an inner diameter about equal to or greater than 7 inches.

Still other embodiments provide missiles where the feed bores are offset axially from each other along the primary bore.

Yet other embodiments provide missiles where the conduit extending through the feed bores and the nipple bores forms a long-sweep curve into the primary bore. The conduit may have a sweep ratio of from about 1.25 to about 8.

Still other embodiments provide missiles where the feed bores intersect with the primary bore at an interior angle of about 45° or at an interior angle of from about 15° to about 60°.

Additional embodiments provide missiles where the missile has a ported cap joined to the upstream the union end of the missile body.

Further embodiments provide novel frac manifolds mounted on a frame. The novel frac manifolds have an embodiment of the novel missiles. Other embodiments provide novel high-pressure fluid transportation system. The systems comprise an embodiment of the novel missiles. The high-pressure fluid transportation system may be a system for fracturing a well.

Other embodiments provide methods of assembling a high-pressure fluid transportation system. The novel methods comprise assembling an embodiment of the novel missiles into the system.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
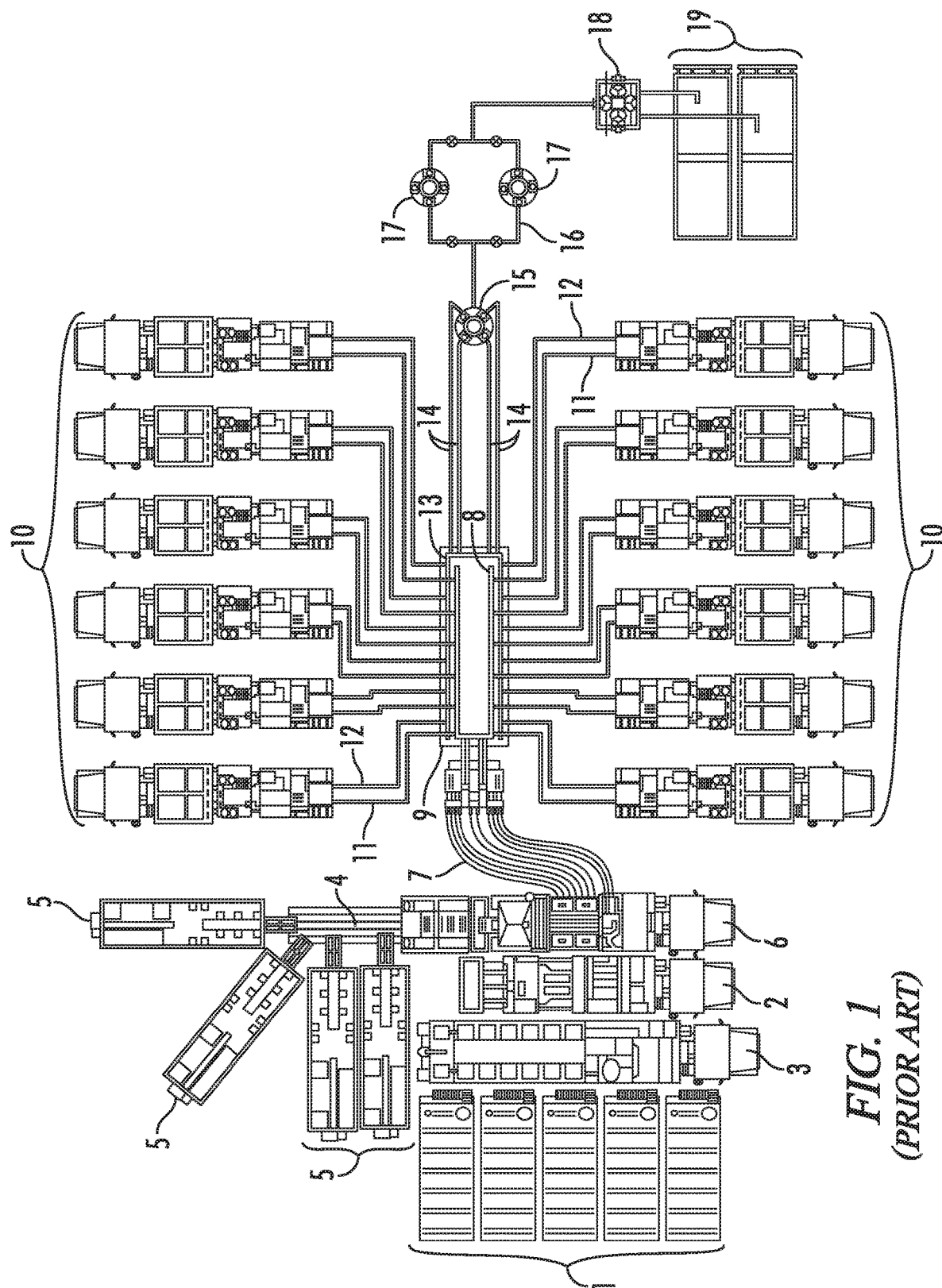
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. The drawing figures also are not necessarily to scale. Certain features of the embodiments may be shown exaggerated in scale or in somewhat schematic form and some details of conventional design and construction may not be shown in the interest of clarity and conciseness. For example, in large part the threaded fasteners used to assemble inlet assemblies 30 of missile 113 are omitted.

DESCRIPTION OF ILLUSTRATIVE EMBODIMENTS

The invention, in various aspects and embodiments, is directed generally to fluid transportation systems and flow lines used in those systems, and especially to frac missiles and manifolds that are used to convey abrasive, corrosive fluids under high pressure. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel frac missiles and manifolds typically will be used to manifold the discharge from a plurality of pumps. They are particularly useful for temporary installations that must be assembled and disassembled on site and which may be installed at various sites. Such systems are common in chemical and other industrial plants, on marine dredging vessels, strip mines, and especially in the oil and gas industry. Frac systems, such as those shown in FIG. 1, are a very common application where temporary high-pressure flow lines are routinely assembled and disassembled at various sites to provide fluid conduits between process or flow units for different wells.

Figure 2:
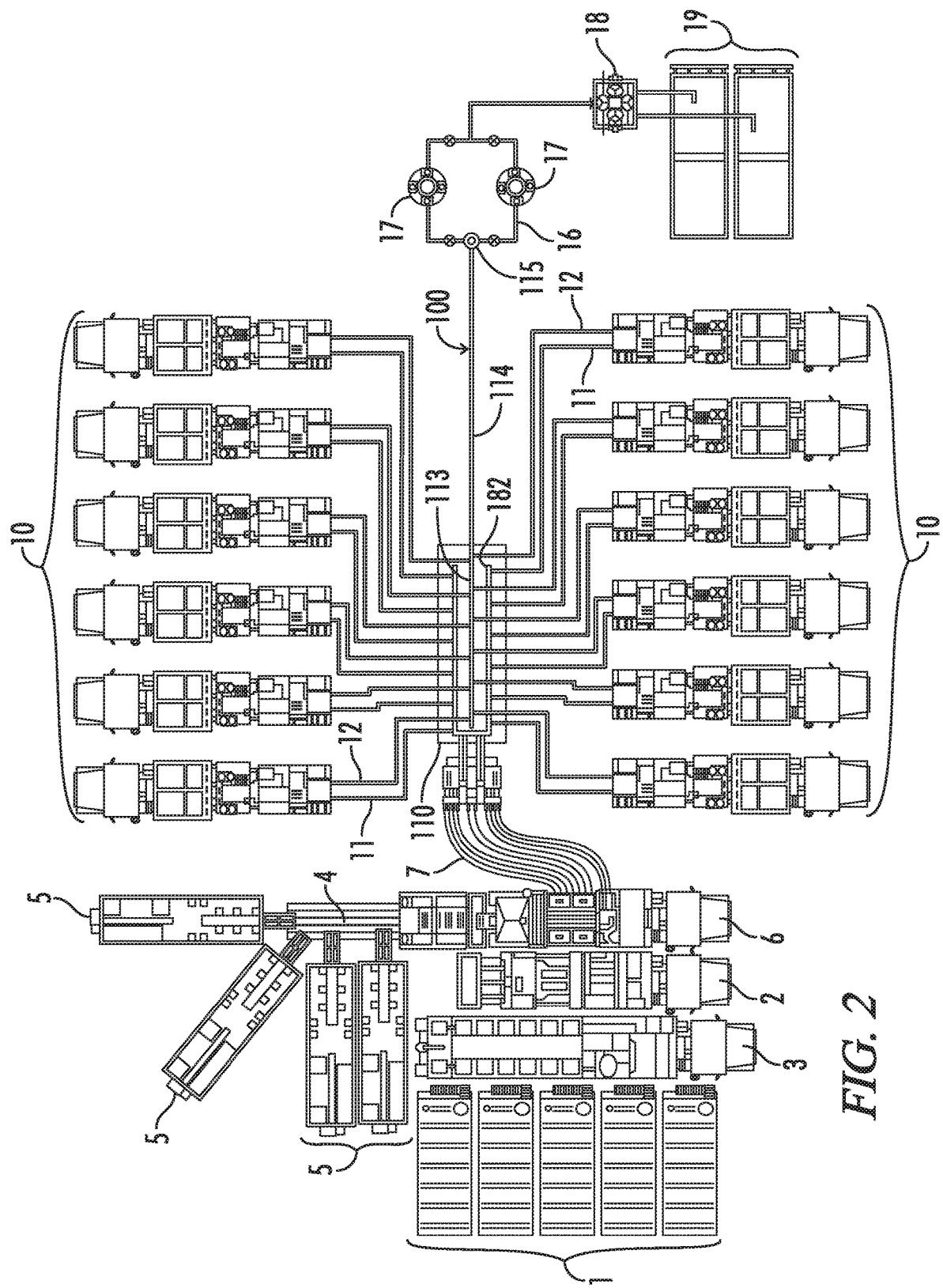
FIG. 2 is a schematic view of a frac system incorporating a first preferred, chassis mounted embodiment 110 of the novel frac manifolds of the subject invention. A first preferred embodiment 113 of the missiles of the subjection invention is coupled to a single flow line 114 running to junction head 115 of zipper manifold 16, thus providing a single high-pressure conduit 100 between pumps 10 and zipper manifold 16.

The novel frac manifolds are particularly suited for use in frac systems such as the system shown in FIG. 1. For example, a first preferred embodiment 110 of the frac manifolds of the subject invention is shown schematically in FIG. 2. Frac manifold 110, and the novel frac system shown in FIG. 2, is identical in many respects to frac manifold 9 and the frac system of FIG. 1. It will be noted that frac manifold 9 incorporates a pair of relatively small diameter missiles 13, one on each side of frac manifold 9. The two missiles 13 receive the discharge from pumps 10, are manifolded at their downstream ends, and discharge into four relatively small diameter high-pressure flow lines 14 that feed into goat head 15.

In contrast, novel frac manifold 110 incorporates a single, first preferred embodiment 113 of the novel missiles. Single missile 113 may be connected to all of the pump discharge lines 12. Missile 113 receives the entire discharge of pumps 10. Single missile 113 in turn discharges into a single flow line 114 running to junction head 115 of zipper manifold 16. Flow line 100, i.e., the assembly of missile 113 and flow line 114, thus provides a single high-pressure conduit between pumps 10 and zipper manifold 16.

Figure 3:
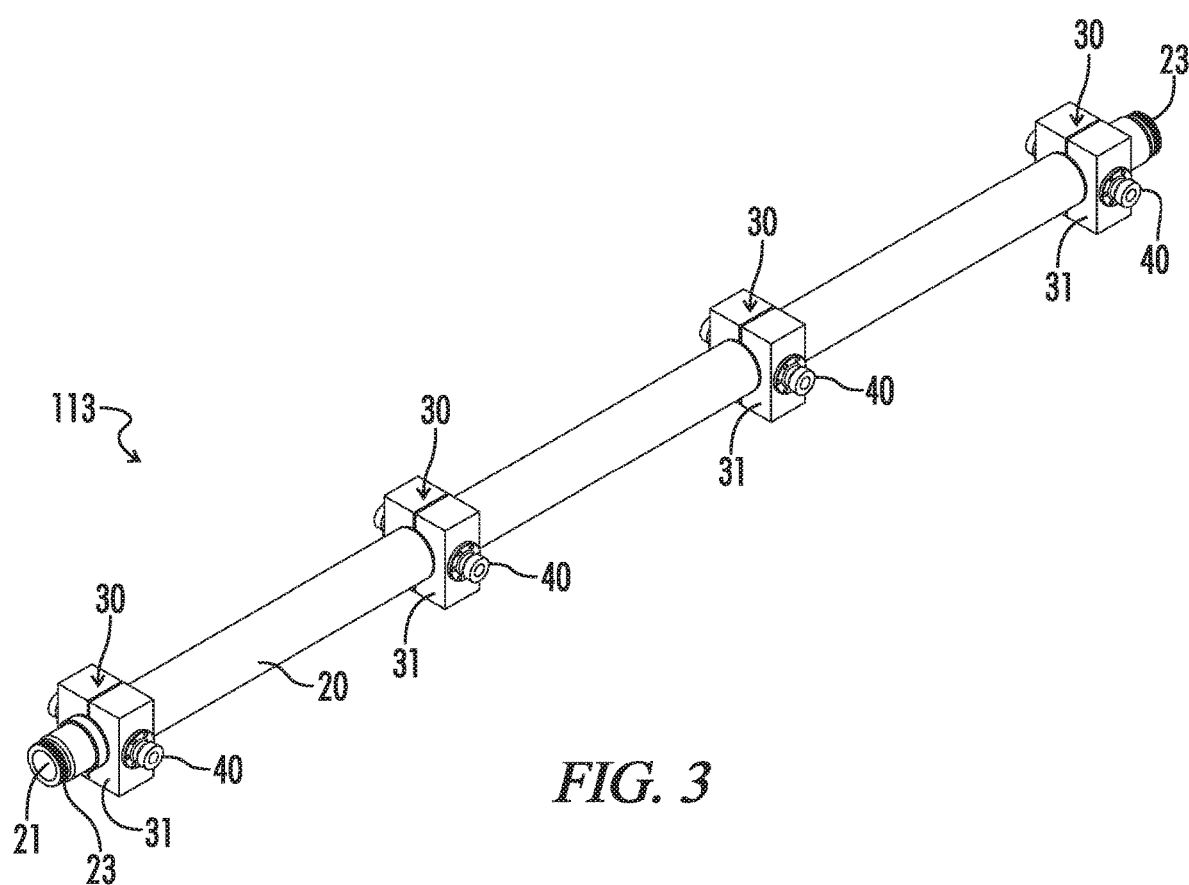
FIG. 3 is an isometric view of missile 113 shown schematically in FIG. 2.

Missile 113 is shown in further detail in FIGS. 3-8. As seen therein, missile 113 generally comprises a body 20 and a plurality of inlet assemblies 30. Only four inlet assemblies 30 are shown in FIG. 3. It will be appreciated, however, that body 20 may be of any suitable length and any number of inlet assemblies 30 may be provided to accommodate more or fewer pumps 10. Typically, missile 113 might be provided with from four to ten inlet assemblies 30.

Missile body 20 is generally tubular and has an elongated open cylindrical shape. It defines a substantially straight bore 21 and has a plurality of feed bores 22. Bore 21 provides the primary conduit through which slurry passes as it is conveyed towards well head 17. Feed bores 22 extend radially through missile body 20 and provide inlets for slurry discharged from pumps 10. Primary bore 21 extends axially through body 20 between union ends 23. Union ends 23 are adapted to allow missile 113 to be connected to other flowline components.

For example, other flowline components may be assembled to missile 113 by conventional pin-in-box unions. The "box" in a pin-in-box union is simply a short tubular that has opposing internal threads at each end. Thus, union ends 23 have external "pin" threads that engage internal threads on one end of the box. Other flowline components having pin threads may be assembled to missile 113 by threading them into the other end of the box. Downstream components, such as flow line 114, may be connected to the downstream end of missile 113. The upstream end of missile 113 typically will be provided with a blind cap or, preferably, a ported cap that allows missile 113 to be flushed out. It will be appreciated, of course, that union ends 23 also may be provided with other types of union subs, such as hammer union, flange union, or clamp union subs.

Inlet assemblies 30 generally comprise a collar 31 and a nipple 40. Nipple 40, as described further below, is adapted to provide a connection between missile body 20 and, for example, discharge lines 12 of pumps 10. Collar 31 is adapted to couple nipple 40 to missile body 20. For example, as may be seen in FIGS. 3-8, collar 31 comprises mating halves 31a and 31b that may be coupled together around missile body 20.

More particularly, each collar half 31a and 31b extends approximately halfway around the circumference of missile body 20. They have an inner surface that is adapted to engage missile body 20. Preferably, collar halves 31a/31b are able to fit closely around missile body 20. Missile body 21 being generally cylindrical, the engagement surface of collar halves 31a/b thus has a substantially semi-cylindrical curve to it.

Collar halves 31a/b are releasably coupled to each other. For example, as best appreciated from FIGS. 4 and 7, collar half 31a is provided with through holes 32a, and collar half 31b is provided with threaded bottomed holes 32b. Threaded studs (not shown) may be provided in bottomed holes 32b. Thus, collar halves 31a/b may be assembled to each other by passing the threaded studs through holes 32a and threading nuts on their ends. Other threaded connectors, however, may be provided, such as threaded bolts, or collar halves 31a/b may be assembled by other conventional connectors.

Nipples 40 may be formed integrally with collar halves 31a/b. Preferably, however, they are releasably coupled to collar halves 31a/b. For example, collar halves 31a/b are each provided with a bore 33. Collar bores 33 extend from the side faces of collar halves 31a/b and are aligned axially with their respective feed bores 23. They are sized to accommodate an inner portion of nipple 40.

Nipple 40 has a generally cylindrical body defining an axial bore 41. One end of nipple 40 provides a spigot 42 and the other a union end 43. Spigot 42 extends through bore 33 in collar halves 31a/b and into a first, inner enlarged diameter portion of feed bores 22. The enlarged portion of feed bores 22 provides a socket 24 for spigot 42. A seal is provided between spigot 42 and socket 24, such as an elastomeric O-ring carried within an annular groove extending around spigot 42. Bent washers or a metal seal ring also may be provided between the nose of spigot 42 and the bottom of socket 24.

Nipple 40 may be coupled to collar halves 31a/b by threaded connectors. For example, nipple 40 is provided with an annular flange 44 having a number of through holes. Threaded studs (not shown) may be provided in bottomed holes 34 in collar halves 31a/b, thus allowing nipple 40 to be assembled to collar halves 31a/b via flange 44. Alternately, bore 33 in collar halves 31a/b may be provided with internal threads and nipple 40 may be provided with external threads, allowing nipples 40 to be threaded into collar 31. Other conventional connections may be used.

Union end 43 of nipple 40 is adapted to enable another flowline component to be joined to nipple 40, such as discharge hoses 12 from pumps 10. Union end 43 of nipple 40 is illustrated schematically as a female sub for a hammer union, but other types of union subs and connections may be provided. For example, union end 43 may be provided with flanges for a clamp or flange union. Threaded connections or other conventional connections also may be provided if desired.

Inlet assembly 30 also preferably comprises a locator 35 that helps to prevent missile body 21 and collar 31 from rotating or shifting axially relative to each other. For example, as best appreciated from FIGS. 4 and 7, locator 35 may be a washer. Washer 35 has an opening sized to accommodate spigot 42 of nipple 40. A second, outer enlarged portion of feed bore 22 provides a recess around the entrance to socket 24 on missile body 20. An inner, enlarged portion of collar bore 33 provides an annular recess in collar halves 31a/b. Washer 35 fits closely within those annular recesses. Once collar halves 31a/b are coupled together, therefore, collar 31 and missile body 20 are fixed relative to each other. Other locators, however, may be provided, such as pins and bores.

It will be noted that there is a slight gap between collar halves 31a/b when they are placed around missile body 20, thus allowing collar halves 31a/b to be pulled tightly against missile body 21. It also will be appreciated that the engagement faces of collar halves 31a/b not only extend around missile body 21, but also extend axially along missile body 21 a significant distance relative to the portion of nipple 40 extending beyond collar 31. Flange 44 also extends radially a significant distance from the body of nipple 40. Thus, collar 31 provides a rugged, secure connection that is highly resistant to torque created on the axis of nipple 40.

Collar 31 also preferably is adapted to provide a mount allowing missile 31 to be assembled to a chassis, such as a trailer. Thus, the bottom surfaces of collar halves 31a/b are flat, allowing collar 31 to be easily connected to the frame of a chassis. Threaded studs (not shown) on the bottom of collar halves 31a/b, for example, may be passed through bolt holes in a horizontal frame member. Threaded studs also may be provided on the sides of collar halves 31a/b and passed through vertical plates extending from a frame member.

In general, missile 113 may be incorporated into frac manifolds and put into service in the same manner as the missiles disclosed in applicant's application Ser. No. 16/027,049 filed Jul. 3, 2018, the disclosure and drawings of which are incorporated herein by reference. For example, missile 113, along with the other components of frac manifold 110, may be mounted on a rolling chassis, such as a trailer. It will include the conventional components of a frac manifold, such as a suction system. The suction system will receive slurry from blender 6 via blender hoses 7. Hoses 7 are attached to a suction manifold that feeds low-pressure suction lines 8 running along each side of the trailer. Suction hoses 11 are connected to suction lines 8 and provide slurry to pumps 10.

In contrast to conventional frac manifold 9, which has two relatively small manifolding missiles 13 which themselves are manifolded, missile 113 will be sized to provide novel frac manifold 110 with a single, larger, straight missile receiving the discharge from all pumps 10. As shown schematically in FIG. 2, pumps 10 from both sides of frac manifold 110 all feed into missile 113. Missile 113, therefore, preferably is mounted along the center of the frac trailer. It may mounted by collars 31 as noted above or by other mounting systems.

Each inlet assembly 30 allows two pumps 10 to feed into missile 113 from opposite sides of trailer 110. Nipples 40 of inlet assemblies 30 will be connected to the array of pumps 10 via pump discharge lines 12. Discharge lines 12, for example, may terminate in a male hammer union sub allowing them to be connected directly to nipples 40. If desired, connection arms may be assembled to nipples 40 which then provide connection ends for discharge hoses 12. Such connection arms typically will swing away from missile 113 and make it easier to connect discharge hoses 12.

The trailer may, and typically will incorporate other features commonly provided in conventional frac trailers. Hydraulic jacks may be provided to level the trailer or to facilitate hooking and unhooking the trailer from a tractor. Running and signal lights may be provided as desired or required by regulation. If desired, however, the novel frac manifolds may be carried on the chassis of a truck, or they may be carried on a non-rolling chassis, such as a skid. They also may be mounted on a rolling or non-rolling chassis to provide modular manifolds. Modular manifolds can provide greater flexibility in meeting the requirements of particular fracturing operations, which may call for greater or lesser numbers of pumps.

It will be appreciated that the novel missiles have fewer potential leak points than conventional missiles. That is, conventional missiles typically are assembled from a large number of smaller components. The primary conduit extends through those components. Each connection between the individual components presents a potential leak point in the primary conduit, especially after the missile has been exposed to cyclic stress over a period of extended service. The body of the novel missiles, however, preferably spans the entire distance of the novel frac manifolds. Missile body 20, for example, is a unitary component and does not have any connections along primary bore 21. Thus, the risk of leaks is significantly diminished.

Moreover, and especially when mounted to a frame through mounts such as collars 31, the novel missiles are quite rigid. They will be expected to absorb much of the stress generated by fluids pumped into them. It is expected, therefore, that less vibration will be transmitted to their connections with other flowline components, for example, discharge hoses 12 and flow line 114. Those connections will be more secure and less likely to leak.

The novel missiles also may be manufactured relatively easily. For example, missile body 20 preferably is manufactured by starting with a generally cylindrical bar, machining primary bore 21, heat treating, and then machining the remaining features, such as feed bores 22, sockets 24, and pin union ends 23. Collar 31 and nipples 40 of inlet assemblies 30 also may be machined from metal stock and may be assembled easily and reliably to missile body 20.

By providing a single missile, such as missile 113, the novel frac manifolds will have a simpler, less cluttered design. They may be assembled more easily, and when in service, will allow greater access to manifold components for hook up and service. More importantly, however, novel frac manifolds incorporating a single, larger missile, such as missile 113, should provide better wear resistance and a longer service life than conventional frac manifolds incorporating multiple missiles.

That is, the slurry flowing through the flow lines is highly abrasive and corrosive, moves at relatively high velocities under high pressure, and is quite turbulent in many areas. Consequently, flowline components tend to suffer material loss that can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at or near normal to the surface, the impact causing tiny radial cracks in the wall. Brittle erosion is the primary dynamic in turbulent areas of the flow line, or where the flow line changes direction.

It also will be appreciated that corrosion generally tends to weaken material in the part. The part, therefore, is more susceptible to both ductile and brittle erosion. Moreover, since flowline components typically are manufactured from relatively hard steels, brittle erosion from near normal impacts caused by more turbulent flow typically plays a larger role than ductile erosion resulting from more laminar flow.

Flow through pump discharge lines 12, for example, typically is fairly turbulent. Discharge lines 12 can incorporate a fair number of 90° turns over a fairly short run. Thus, the feed bores in conventional manifolds can suffer significant erosion. The degree to which nipples 40 extend into feed bores 22 in missile body 20, of course, may be varied. As exemplified, however, nipples 40 lead into and extend through the major portion of feed bores 22. If they become worn and unserviceable, they may be replaced. There is no need to scrap or service missile body 20.

Turbulence and brittle erosion also are the primary dynamics in the area where feed bores discharge into a missile's primary conduit. Fluid entering the missile immediately hits the other side of the primary bore, which in conventional missiles such as missile 13 is only a few inches away. The novel missiles, such as missile body 20, however, may be provided with significantly thicker walls than are present in traditional fittings from which conventional manifold missiles are assembled.

For example, the ratio of the outer diameter of missile body 20 to the diameter of their primary bore preferably is at least about 3:2, and more preferably at least about 2:1 or 3:1. Alternately stated, the minimum thickness of the walls of primary bore 22 in missile body 20 is preferably at least about 25%, and more preferably at least about 50% or 100% of the diameter of primary bore 21. Thus, as illustrated, the outer diameter of missile body 20 is about 3 times as great as the diameter of primary bore 21, and the walls of primary bore 21 are approximately as thick as its diameter.

Moreover, the inner diameter of high-pressure missiles in conventional frac manifolds typically will be sized such that they cumulatively provide the required flow rates (up to 100 bbl/minute) without excessively high fluid velocity through the missiles. The upper limit, often referred to as the erosional fluid velocity, generally is about 40 ft/sec. Thus, missiles in conventional frac manifolds typically will be made up from 3" or 4" components having, respectively, inner diameters of 2.75" and 3.5".

In contrast, novel missiles having comparable flow rates and velocities preferably will have conduits with a diameter of at least about 5 inches or, more preferably, at least about 7 inches. For example, missile 113 may have a primary bore of about 5 inches or 7 inches. Thus, it will be appreciated that fluid entering primary bore 21 of missile body 20 from feed bores 22 will have more room to spread. The quantity and velocity of particles impinging on the other side of primary bore 21 at near normal angles will be less than experienced by smaller diameter pipes, such as missiles 13 in conventional frac manifold 9.

The relatively large inner diameter of the novel missiles, such as missile 113, can help minimize erosion and failure in other ways. As the diameter of a conduit increases, drag on the fluid passing through the conduit increases, but not as rapidly as the volume of fluid. Thus, proportionally there is less drag, and flow through the conduit is more laminar. Moreover, by replacing multiple smaller lines with a single larger line, overall drag on fluid conveyed through the system is reduced. For example, a single 7$\frac{1}{16}$ line may replace six 3" lines. The drag through the larger line will be less than half the cumulative drag through the six smaller lines. More importantly, less drag means less erosion.

It will be noted that feed bores 22 and nipples 40 are situated radially opposite each other on missile body 21. Moreover, nipple bores 41 and feed bores 22 lead into and intersect with primary conduit 21 of missile 113 at substantially right angles. That arrangement allows collar 31 to join multiple nipples 40 to missile body 31 in a more compact design. If desired, however, bores 22/41 and nipples 40 may be offset axially from each other. For example, the width of collar 31 may be increased somewhat to allow nipples 40*a* and 40*b* to be spaced apart along the length of missile body 20. The discharge from nipple bores 41 and feed bores 22 will enter primary bore 21 at axially spaced locations. Alternately, inlet assemblies 30 may be provided with a nipple 40 on only one side of collar 31. The series of inlets assemblies 30 would be arranged such that nipples 40 alternate from one side to the other.

Offsetting the junctions between feed bores 22 and primary bore 21 can help to minimize areas of concentrated turbulence and erosion in missile 113. Turbulence created by fluid entering primary bore 21 from an upstream feed bore 22 will tend to diminish, and the flow will become more laminar as fluid travels down primary bore 21. Feed bores 22, therefore, preferably would be spaced at sufficient distances to allow turbulence from one feed bore 22 to substantially subside before the discharge from the downstream feed bore 22 enters primary bore 21. For example, feed bores 22 may be offset a distance at least approximately equal to the diameter of feed bores 22, and more preferably, at a multiple thereof.

Missile 113 may be modified in other ways to help minimize turbulence and attendant erosion. For example, feed bores 22 and nipples 40 may be modified to provide missile 113 with lateral feeds. That is, if desired, nipple bores 41 and feed bores 22 may be configured to lead into primary bore 21 of missile body 20 at a shallower angle. For example, they may be configured to extend toward primary bore 21 at an interior angle of 45°. Fluid entering primary bore 21 will be encouraged to flow down missile 113 instead of impinging on the opposite side of primary bore 21. The average angle of impact for particles flowing into primary bore 21 will be diminished. Consistent therewith, the lead angle of nipple bores 41 and feed bores 22 into primary bore 21 may be varied. Preferably, it will be substantially less than 90°. Little benefit will be realized at angles near 90°. More preferably, the intersection angle will be from about 15° to about 60°.

Nipple bores 41 and feed bores 22 also may be configured to lead into and intersect with primary bore 31 via a long-sweep curve. By providing bores 22/41 with a long-sweep curve instead of straight-line bores, fluid discharged from feed bores 22 will be directed at an angle more along, and less across the flow of fluid through primary bore 21. To a certain extent the reduction of average impact angle on the other side of primary bore 21 will come at the expense of feed bore 22 and nipple bore 41. Impact erosion will be greater in bore 22/41 than if they were a straight bore. By providing a long-sweep curve, however, the increase in impact erosion will be minimized. Moreover, given that nipples 40 may be replaced easily and more economically than repairing or scrapping missile body 31, sacrificing wear in nipple bore 41 for less wear in missile 31 may be preferable.

Figure 4:
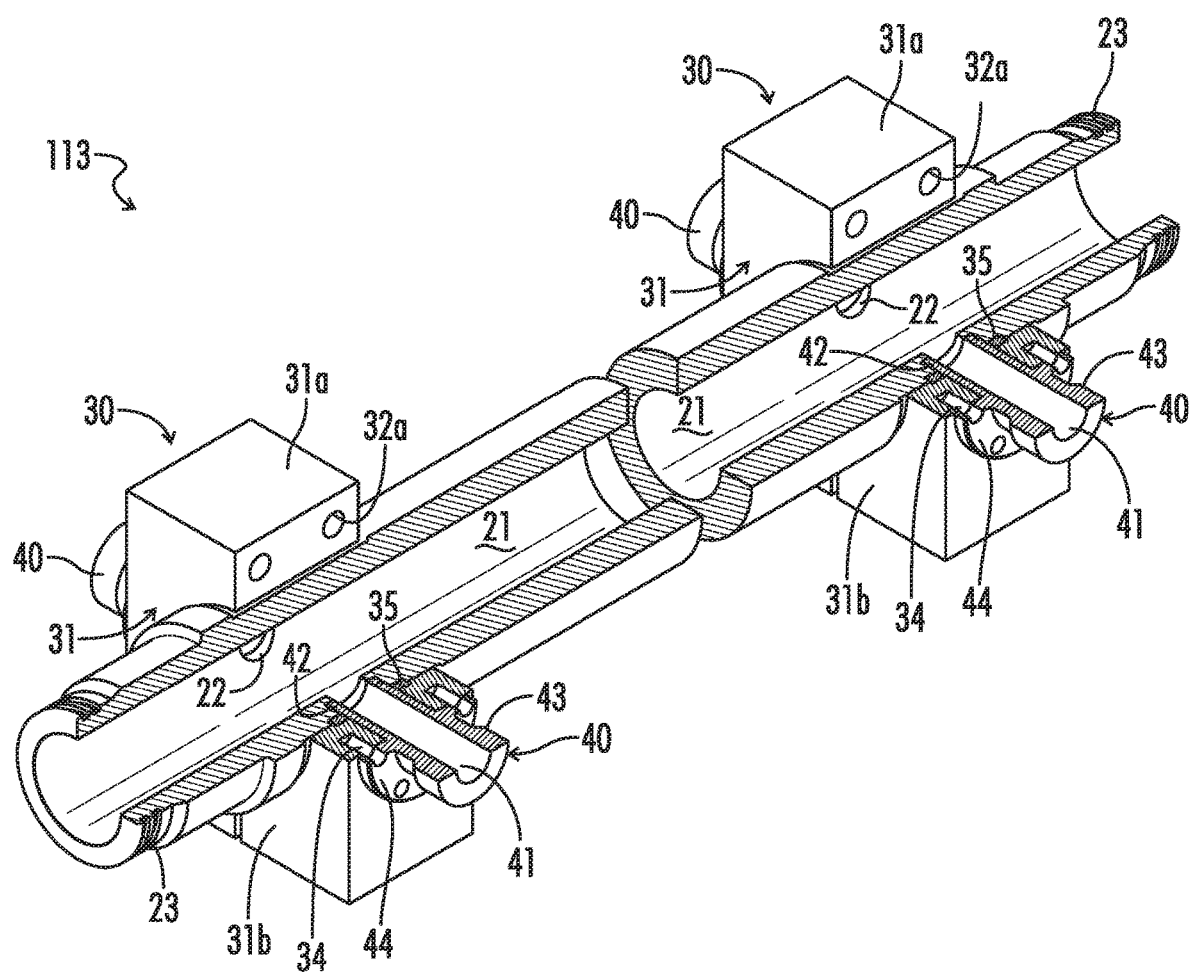
FIG. 4 is an enlarged, truncated isometric view, with an axial quarter-section removed, of missile 113 shown in FIG. 3.
Figure 5:
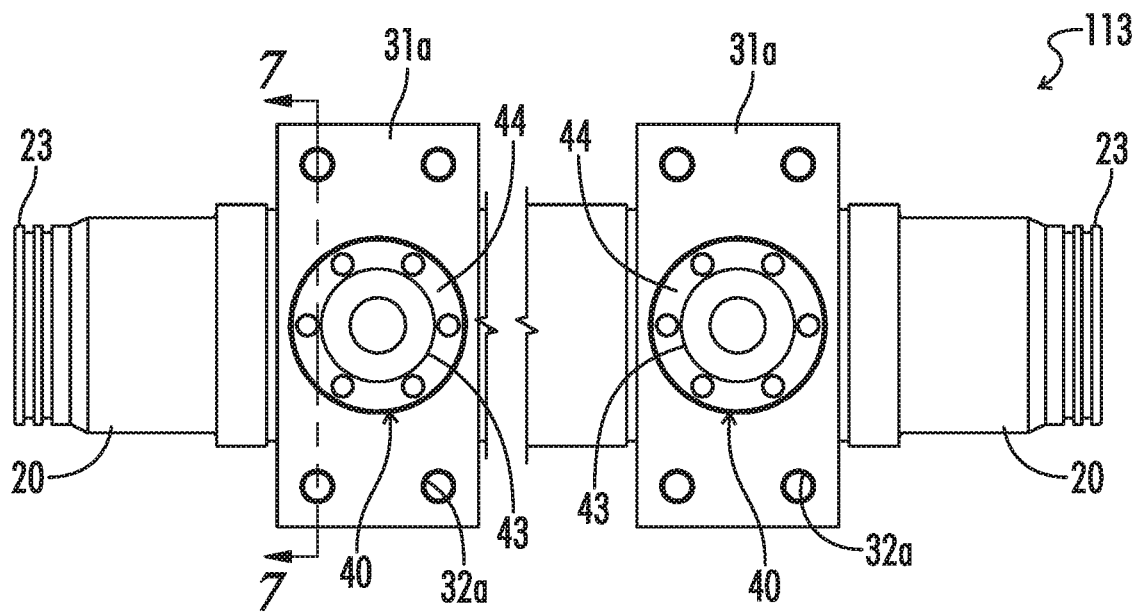
FIG. 5 is a truncated side elevational view of missile 113.
Figure 6:
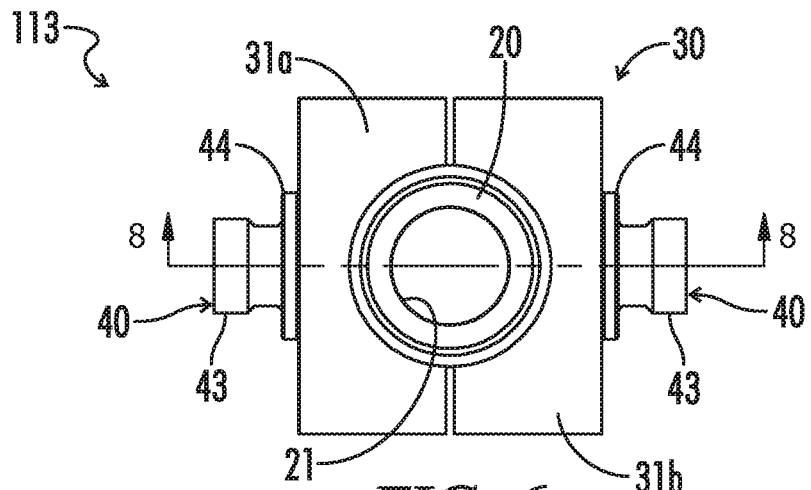
FIG. 6 is an end elevational view of missile 113.
Figure 7:
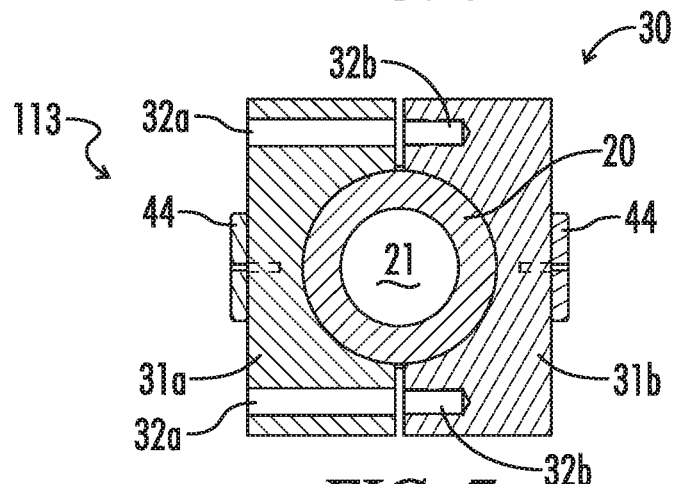
FIG. 7 is a transverse cross-sectional view, taken generally along lines 7-7 of FIG. 5, of missile 113.
Figure 8:
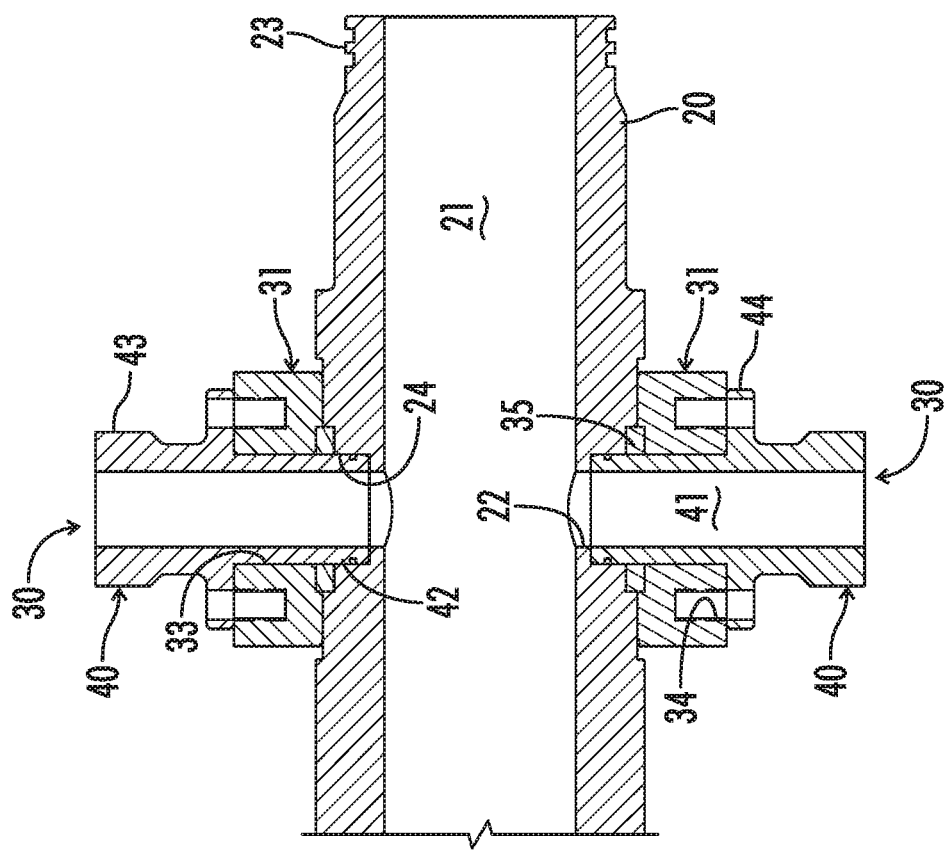
FIG. 8 is a truncated axial cross-sectional view, taken generally along lines 8-8 in FIG. 6, of missile 113.
Figure 8:
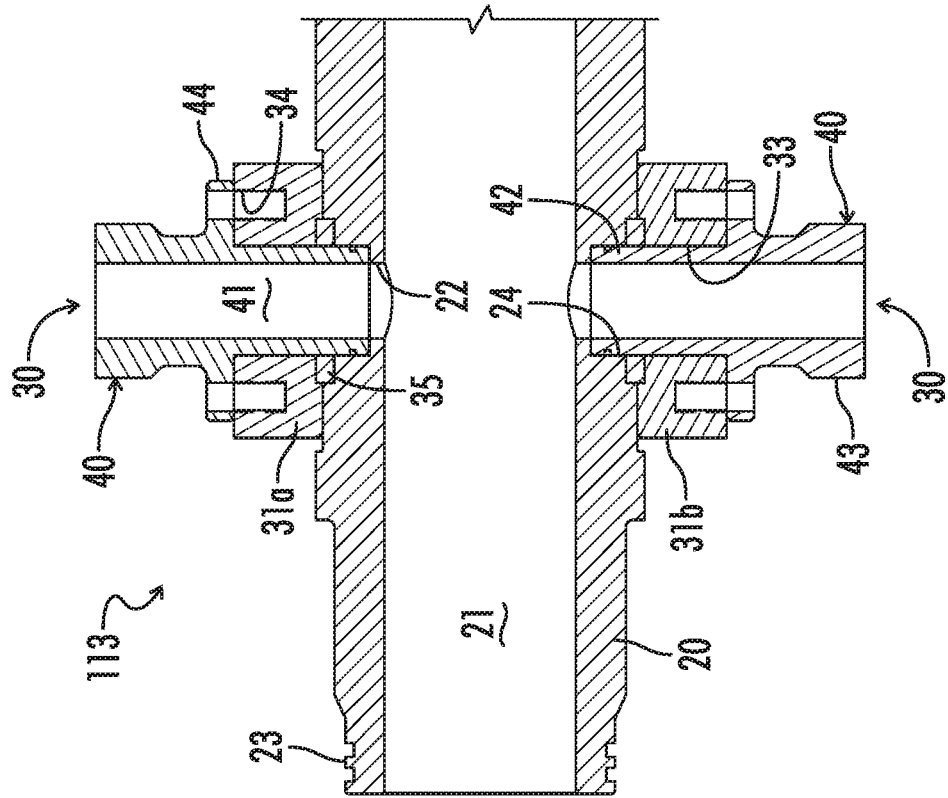
Figure 9:
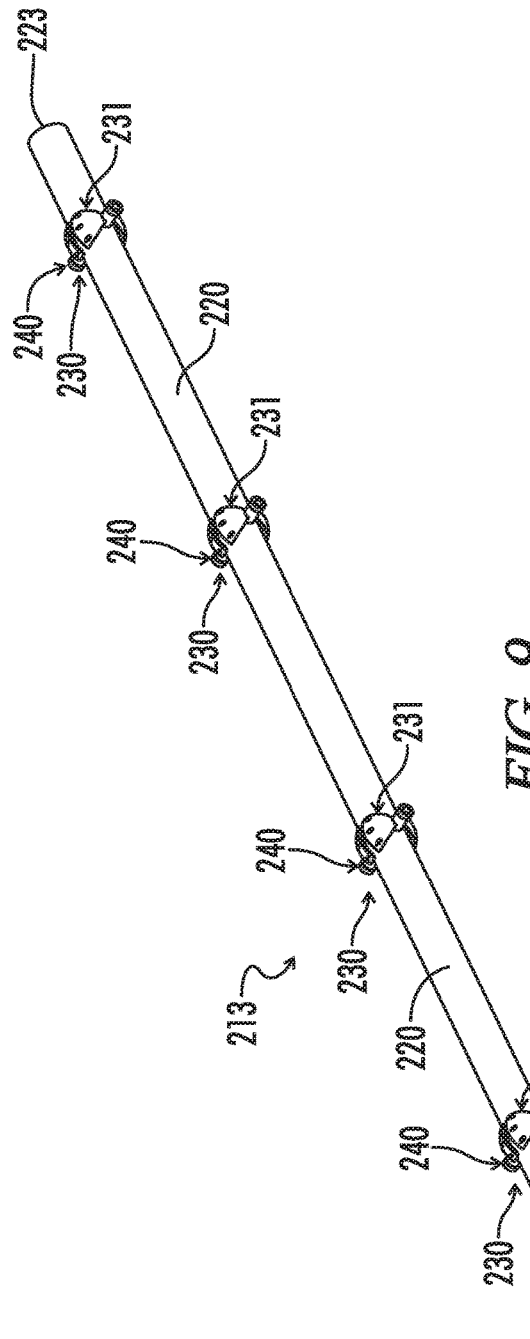
FIG. 9 is an isometric view of a second preferred embodiment 213 of the novel missiles of the subject invention that may be incorporated into frac manifold 110.
Figure 10:
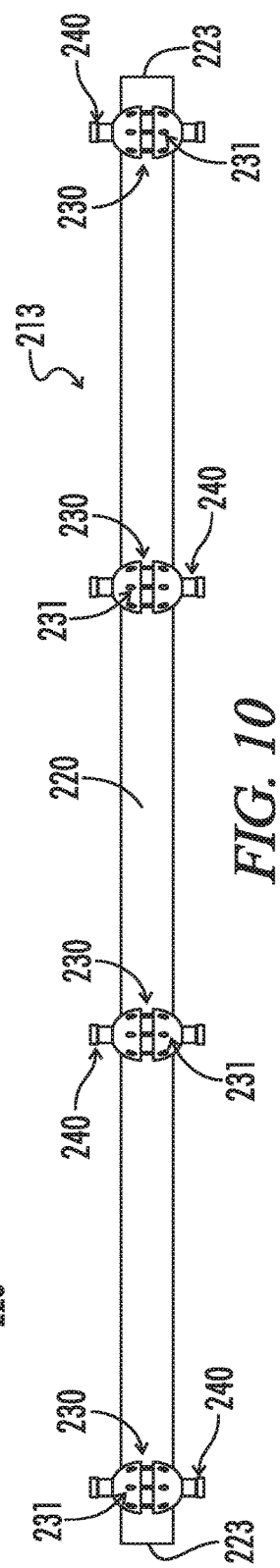
FIG. 10 is a top view of missile 213 shown in FIG. 9.
Figure 11:
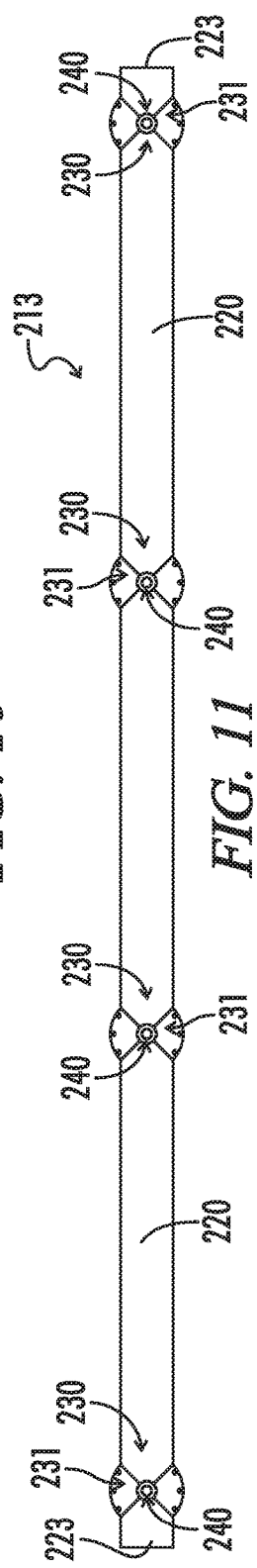
FIG. 11 is a side elevational view of missile 213.

As used herein, a "long-sweep" curve, when used in reference to a particular bore or passage, shall be understood as meaning that the sweep ratio of the bore is about 1.25 or greater. The "sweep ratio" in turn shall be understood as the ratio of the radius of the curve to the diameter of the bore in which the curve is formed. The length of the curve and its sweep ratio may be varied. If nipple bore 41 initially approaches primary bore 21 in missile 113 at right angles, as shown in FIGS. 4 and 7, the curve in bores 41/22 preferably will be longer and necessarily may require a lower sweep ratio. If bores 41/22 are lateral bores and already approach primary bore 21 at a shallower angle, the curve may be shorter and have a higher sweep ratio. It will be appreciated that it will be easier to provide long sweep curves in the novel missiles. It is difficult or impossible to bend tubular stock at such thicknesses.

Thus, it is expected that the novel missiles can provide improvements in wear resistance and service life. Fluid entering a relatively large primary bore will have more room to spread and will tend to create less erosion in the opposite side. Further improvements may be possible by encouraging discharge to flow more along and less across flow in the primary bore by providing lateral bores and long sweep bores. Particles impinging on the other side of primary bore 21 on average will impact at much shallower angles, further reducing the effects of brittle erosion. Turbulence in primary bore 21 will diminish and return to laminar flow more quickly. Moreover, if bores 22/41 are offset, they may be offset to a lesser degree.

A second preferred embodiment 213 of the novel missiles is shown in FIGS. 9-14. As may be seen in FIGS. 9-11, missile 213 generally comprises a missile body 220 and inlet assemblies 230. Missile body 220 is substantially identical to missile body 20 of missile 113. It has a primary bore 221 that extends the length of missile body 220. Feed bores (not shown) are provided and lead into primary bore 221. The ends of missile body 220 will be provided with union subs, such as pin threads like those provided on missile body 20 of missile 113 or other conventional union subs.

Figure 12:
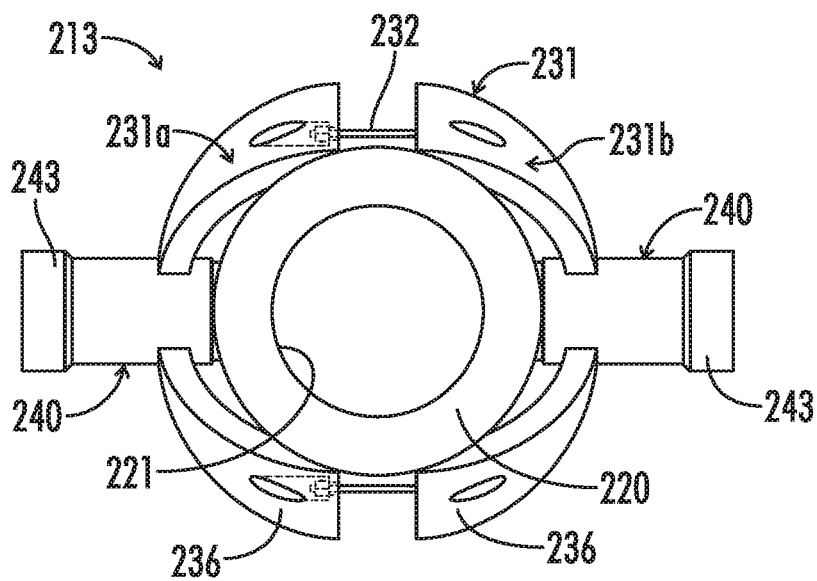
FIG. 12 is an enlarged, end elevational view of missile 213.
Figure 13:
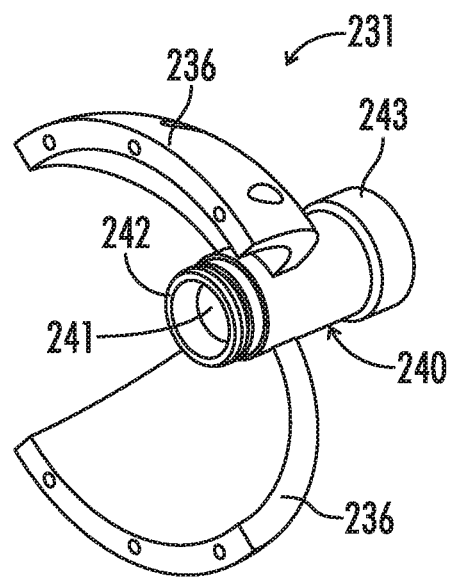
FIG. 13 is an isometric view of a collar half 231 of missile 213.
Figure 14:
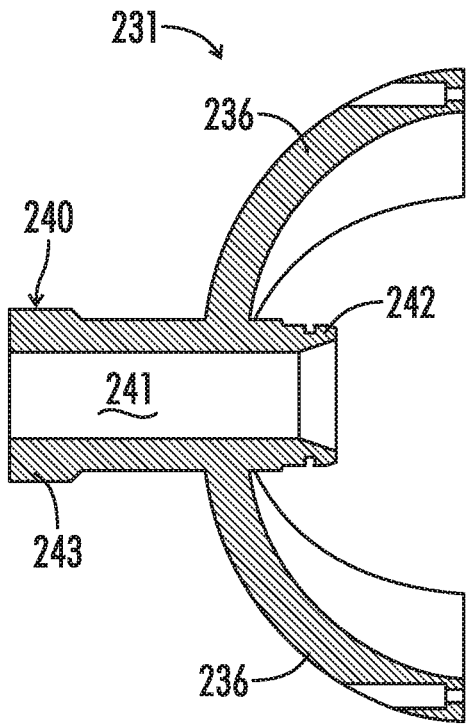
FIG. 14 is a cross-sectional view of collar half 231 shown in FIG. 13.

Inlet assemblies 230, however, are similar in some respects to inlet assemblies 30, but dissimilar in others. As best seen in FIGS. 12-14, inlet assembly 230 comprises a collar 231 and a nipple 240. Collar 231 is made up of two mating halves 231*a* and 231*b*. Each collar half 231*a/b* extends approximately halfway around missile body 220.

They may be releasably coupled together around missile body 220 by threaded connectors as are collar halves 31a/b of missile 113.

In contrast to inlet assemblies 30 of missile 113, however, collar halves 231 of missile 213 and nipples 240 are integral components. More specifically, collar halves 231 each may be viewed as having two subs 236. Subs 236 have a generally curved shape that flares outward as subs 236 extend away from nipple 240 and generally around a quarter section of the circumference of missile body 220. The first end of subs 236 is connected to nipple 240 by being formed integrally therewith. The second end of subs 236 are provided with surfaces that will engage missile body 20. They also are adapted to be coupled to a second end of the subs 236 of the other collar half 231a/b by, for example, threaded connectors, such as threaded studs 232.

Nipples 240, like nipples 40, have a generally cylindrical body defining an axial bore 241. As best seen in FIG. 14, one end of nipple 240 provides a spigot 242 and the other a union end 243. It will be appreciated that spigot 242 will extend into a socket provided in the feed bores of missile body 220. An elastomeric O-ring will be carried in an external, annular groove in spigot 243 to provide a seal with the feed bore socket. Bent washers or a metal seal ring also may be provided between the nose of spigot 242 and the bottom of the socket in lieu of or in addition to the O-ring.

Nipples 240 are adapted to provide a connection between missile body 220 and, for example, discharge lines 12 of pumps 10. Thus, union end 243 of nipple 240 is illustrated schematically as a female sub for a hammer union. Other types of union subs, however, may be provided, such as clamp or flange union subs. Likewise, a washer or other locator may be provided to fix inlet assemblies 230 to missile body 220.

As illustrated, collar halves 231a/b and their respective nipples 240 are integral components. If desired, however, collar subs 236 and nipples 240 may be fabricated as separate components and releasably coupled to each other. For example, an annular shoulder or groove may be provided on the body of nipple 240. The first ends of half subs 236 may extend over and around such shoulders or into such grooves. When collar halves 231a/b are coupled together, nipples 240 will be securely held in place by the interference between the subs ends and such features. The shoulders, grooves, and sub ends may be provided with lips and the like to enhance the connection. Alternately, nipple 240 may be provided with a flange, similar to flange 44 of nipples 40. The first end of the half subs then may be connected to nipples 240 by threaded connectors. In any event, it may be easier to fabricate the collar halves and nipples as separate components, particularly if the missile will have offset, lateral, or long-sweep bores.

Like missile 113, missile 213 may be manufactured in any of the sizes commonly found in frac iron. They are not limited to a particular size. At the same time, however, when manufactured in relatively large sizes with relatively large internal diameters, the novel missiles can provide a single, relatively large flowline through a frac manifold. Preferably, the diameter of novel missiles will approximate or equal, or even exceed the inner diameter of the production liner extending into the well.

The missiles and frac manifolds of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, the missile bodies and inlet assemblies, except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part. Conventional components of the novel missiles are widely available from a number of manufacturers.

Similarly, the missiles and frac manifolds have been described in the context of frac systems. While frac systems in particular and the oil and gas industry in general rely on temporary flow lines, the novel missiles and manifolds are not limited to such applications or industries. Suffice it to say that they may have wide applicability in those fluid transportation systems where temporary flow lines have been conventionally applied, especially in the conveyance of abrasive fluids under high pressure.

While this invention has been disclosed and discussed primarily in terms of specific embodiments thereof, it is not intended to be limited thereto. Other modifications and embodiments will be apparent to the worker in the art.

What is claimed is:

1. A missile flow line for manifolding the discharge from a plurality of high pressure pumps, said missile comprising:
 (a) a missile body having a straight primary bore and a plurality of feed bores;
  i) said primary bore extending axially through said missile body; and
  ii) said feed bores extending radially through said missile body to said primary bore and defining a socket; and
 (b) an inlet assembly associated with each said feed bore, said inlet assembly comprising a nipple and a collar;
  i) said nipple having a bore extending axially between a spigot and a union end;
   (1) said nipple being connected to said collar;
   (2) said spigot being received in said socket of said feed bore; and
   (3) said union end adapted for connection to a flowline component communicating with the discharge of one of said plurality of pumps;
  ii) said collar comprising mating parts releasably coupled together around said missile body, said coupling of said collar parts thereby releasably coupling said nipple to said missile body.

2. The missile of claim 1, wherein said missile comprises a locator locking said collar in a location along said missile body.

3. The missile of claim 2, wherein said locator is a washer received in an annular recess around said feed bore socket and an annular recess in said collar.

4. The missile of claim 1, wherein said missile body is machined from a cylindrical bar.

5. The missile of claim 1, wherein said inlet assembly comprises two said nipples.

6. The missile of claim 1, wherein said nipple is releasably coupled to said collar.

7. The missile of claim 6, wherein said nipple comprises a flange and said flange is releasably coupled to said collar by threaded connectors.

8. The missile of claim 1, wherein said collar comprises first and second halves joined by threaded connectors, each said half extending approximately halfway around said missile body.

9. The missile of claim 8, wherein said collar has a substantially cylindrical engagement surface receiving said missile body and has a flat lower bearing surface.

10. The missile of claim 8, wherein said first and second collar halves each comprise a first sub and a second sub, each said sub having a first end connected to said nipple and a second end adapted for releasable coupling to a second end of a said sub of the other collar half.

11. The missile of claim 10, wherein said first ends of said subs are integral with said nipple and said second ends are releasably coupled to its said mating component by threaded connectors.

12. The missile of claim 10, wherein said first and second subs have a curved shape.

13. The missile of claim 1, wherein said missile has a generally cylindrical missile body and the ratio of the diameter of said missile body to the diameter of said primary bore is at least about 3 to 2.

14. The missile of claim 13, wherein said ratio is at least about 2 to 1.

15. The missile of claim 13, wherein said ratio is at least about 3 to 1.

16. The missile of claim 1, wherein said feed bores are offset axially from each other along said primary bore.

17. A frac manifold mounted on a frame, said frac manifold comprising a missile of claim 1.

18. A high-pressure fluid transportation system, said system comprising a missile of claim 1.

19. The high-pressure fluid transportation system of claim 1, wherein said system is a system for fracturing a well.

20. A method of assembling a high-pressure fluid transportation system, said method comprising assembling a missile of claim 1 into said system.

21. The missile of claim 1, wherein said spigot is received in said socket of said feed bore without extending into said primary bore.

22. The missile of claim 1, wherein said missile comprises a radial seal between said spigot and said socket.

23. The missile of claim 1, wherein said missile comprises a face seal between a nose of said spigot and a bottom of said socket.

* * * * *